No. 809,044. PATENTED JAN. 2, 1906.
J. T. CLARK.
AUTOMATIC NUT LOCK.
APPLICATION FILED MAY 31, 1905.

WITNESSES
Stuart R. W. Allen.
Frank Munn

INVENTOR
JAMES T. CLARK.

UNITED STATES PATENT OFFICE.

JAMES TEMPLE CLARK, OF WINNIPEG, CANADA, ASSIGNOR OF ONE-HALF TO GEORGE DONALD McKAY, OF WINNIPEG, CANADA.

AUTOMATIC NUT-LOCK.

No. 809,044.  Specification of Letters Patent.  Patented Jan. 2, 1906.

Application filed May 31, 1905. Serial No. 263,053.

*To all whom it may concern:*

Be it known that I, JAMES TEMPLE CLARK, of the city of Winnipeg, Province of Manitoba, Dominion of Canada, have invented certain new and useful Improvements in Automatic Nut-Locks, of which the following is a full, clear, and exact description.

My invention relates to automatic nut-locks; and it consists, essentially, of a washer stamped from sheet metal, preferably spring-steel, and having a plurality of fingers cut from its surface, as hereinafter more particularly described.

It is well known that the constant jarring to which nuts are subjected often loosens them from the bolts to which they are attached and frequently causes serious inconvenience or accident.

The object of my invention is to provide a device that, while performing all the functions of a washer, will automatically lock a nut on a bolt and positively prevent the nut from turning in a backward direction without the use of extraordinary force.

Figure 1:
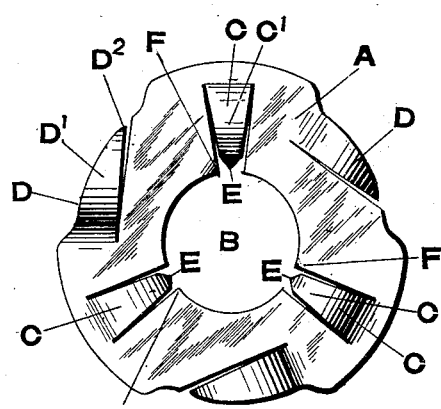
Figure 2:
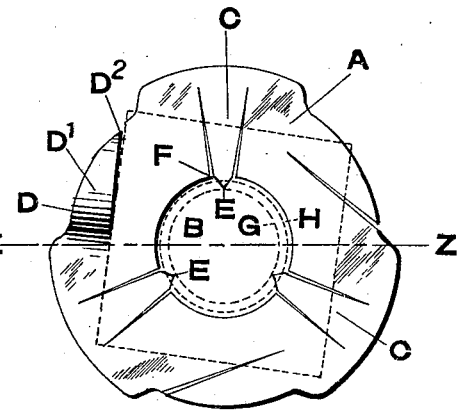
Figure 4:
Figure 3:
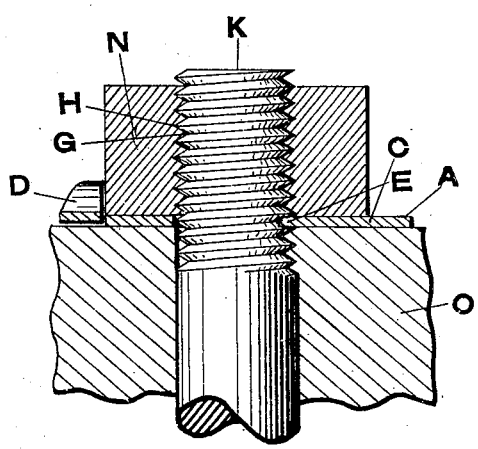
Figure 5:
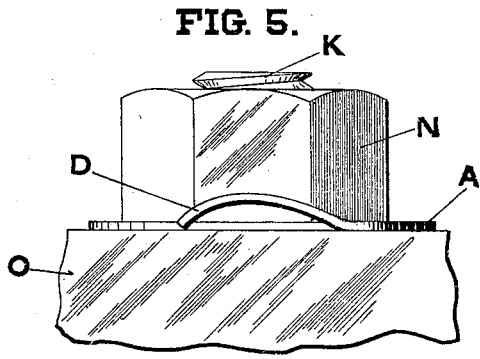

In the accompanying drawings, which illustrate my invention, Figure 1 is a plan view of the preferred form of my device. Fig. 2 is a plan view showing the position of a nut when screwed down and held from backward movement by the outer finger. Fig. 3 is a sectional elevation showing the inner finger embedded in the thread of a bolt and the outer finger holding the nut in place. Fig. 4 is a sectional view of the washer on the line Z Z of Fig. 2. Fig. 5 is an elevation further illustrating the nut held in position by one of the outer fingers.

In the preferred form of my invention I employ a washer A of tempered spring-steel of suitable thickness and of the shape shown in Fig. 1, having a central circular opening B to allow the passage of a bolt therethrough. Extending radially from the central opening are a plurality of fingers C, preferably three in number, which are cut a suitable distance into the body of the washer. These fingers are pointed at their extremities E and are bent upwardly at the center C', so that the points will normally lie flush with the periphery of the central opening B, as shown in Fig. 1. The fingers, however, are of such a length that when flattened down level with the surface of the washer the pointed extremities E will project into the central opening to the extent of approximately the depth of the thread of a bolt, as shown in Fig. 2. The points of the fingers C do not lie normally in a horizontal direction parallel with the surface of the washer, but are bent upwardly from left to right when looking toward the points, as shown in Fig. 4, which shows the finger-points inclined from the lower edge W to the upper edge, (designated X.) It will be understood that the washer, as shown in the drawings, is designed for a right-hand-threaded bolt, and the purpose of the inclined points is to allow a nut to pass freely from left to right over the finger-points without the possibility of the under surface of the nut being caught by the edge of the finger C. This allows a nut to be screwed down on the washer without the latter being carried around the bolt with the nut. To further prevent the washer from turning with the nut, the points F adjacent to the lower edge W of the fingers C are turned slightly in a downward direction, so that when any pressure is placed on the washers these points will be forced into the material upon which the washer is placed, and so prevent the washer from turning. At the outer periphery of the washer and preferably between the fingers C a second series of fingers D are cut from the washer, as shown in Figs. 1 and 2. The middle portions D' of these fingers are bent upwardly from the washer, as shown in Figs. 1, 3, and 5, while the points $D^2$ normally lie flush with the surface of the washer. These outer fingers are arranged so that in turning a nut from left to right over the washer the points of the fingers lie away from the nut.

The operation of my device is as follows: The bolt K is inserted in the material O and the washer A is placed on the threaded end of the bolt. The nut N is then screwed down and on coming in contact with the fingers C passes freely over them, as above described. The fingers C are gradually forced down flush with the surface of the washer, and the points E are forced from the outer circumference H through the thread to the inner circumference G, cutting out a small V-shaped opening, and finally embed themselves in this V-shaped opening, as shown in Figs. 2 and 3, thus preventing any turning movement of the washer. The downwardly-turned points F are at the same time forced into the material under the washer, and thus further prevent the washer from turning with the nut. As the nut passes over the fingers D the upwardly-bent central portion D' is forced downward; but immediately on being released as the edge of the nut passes over the finger the middle portion D' springs back again to its normal position. When the nut is sufficiently tightened, one edge may be left against the upwardly-bent portion of the finger D, as shown in Figs. 2, 3, and 5, thus effectually preventing the nut from turning in a backward direction without the use of extraordinary force. The points $D^2$ of the fingers D being flush with the surface of the washer, the nut may be forced with a wrench in a backward direction without breaking the fingers; but a considerable amount of force is necessary to turn the nut in this direction. It will be obvious that by using some external means to force down the fingers D the nut may be unscrewed.

The preferred form of my invention is trefoil, as shown, but may be circular or of any other suitable shape. I also prefer to use three fingers in each series, but do not desire to limit myself to any precise number.

The advantages of my device will be apparent from the foregoing description. The washer can be easily and cheaply made, being stamped from spring-steel and suitably tempered. It performs the functions of a washer and at the same time acts positively and effectually to lock the nut against backward movement. When it is necessary to use this washer with a left-hand-threaded bolt, it will be obvious that the points of the radial fingers will be bent in the opposite direction and the outer fingers cut in the opposite direction to that shown in the drawings.

Having thus described my invention, so that the same may be readily understood by those skilled in the art to which it appertains, what I claim, and desire to secure by Letters Patent, is—

1. A nut-lock comprising a washer having a plurality of integral, pointed, radial fingers upwardly curved at their central portions and adapted, when flattened down, to extend into the central opening of the washer, and a plurality of integral, pointed, outer fingers upwardly curved at their centers and having their points lying flush with the surface of the washer.

2. A nut-lock comprising a washer of spring metal having a plurality of integral, pointed, radial fingers upwardly curved at their centers and bent upwardly from left to right at their pointed ends to engage the under side and prevent backward turning of the nut, and a plurality of outer fingers upwardly curved at their central portions and having their ends lying flush with the surface of the washer.

3. In a washer having a central opening, a plurality of radial fingers having upwardly-curved central portions and inclined pointed ends extending into the central opening of the washer, downwardly-extending points in the periphery of the central opening adjacent to the radial fingers, and a plurality of outer fingers upwardly curved at their central portions and having their ends lying flush with the surface of the washer.

4. A nut-lock comprising a washer having a central opening, a plurality of radial fingers having upwardly-bent central portions and inclined pointed ends adapted to engage the thread of a bolt, downwardly-bent points on the periphery of the central opening adapted to engage the material underneath the washer, and outer pointed fingers bent upwardly at their central portions and having their points flush with the surface of the washer.

5. A nut-lock comprising a washer having a plurality of radial fingers with upwardly-bent central portions and inclined pointed ends, a plurality of downwardly-turned points adjacent to said fingers and a series of outer pointed fingers upwardly bent at their central portions and adapted to lock a nut against return movement.

6. A nut-lock comprising a trefoil-washer having radial fingers with upwardly-bent central portions and inclined pointed ends adapted to engage the thread of a bolt, downwardly-turned points on the periphery of the central opening of the washer adapted to prevent the washer from turning with the nut, and outer fingers bent upwardly at their central portions and adapted to lock the nut against return movement.

In witness whereof I have hereunto set my hand in the presence of two witnesses.

JAMES TEMPLE CLARK.

Witnesses:
  SAM. H. SHANK,
  ALEX. McMILLAN.